United States Patent [19]

Saburo

[11] Patent Number: 4,499,406
[45] Date of Patent: Feb. 12, 1985

[54] ELECTRONIC DISCHARGE TUBE AND ELECTRONIC LIGHT EMITTER USING IT

[75] Inventor: Numata Saburo, Urawa, Japan

[73] Assignee: Fuji Photo Optical Co., Ltd., Japan

[21] Appl. No.: 360,818

[22] Filed: Mar. 22, 1982

[30] Foreign Application Priority Data

Mar. 30, 1981 [JP] Japan .................. 56-46744

[51] Int. Cl.$^3$ .......... H01J 7/44; H01J 17/34; H01J 19/78; H01J 29/96
[52] U.S. Cl. ................ 315/57; 313/594; 313/596; 315/60; 362/297; 362/298; 362/327
[58] Field of Search .......... 315/57, 60; 313/594, 313/596; 362/297, 298, 299, 327, 329, 17

[56] References Cited

U.S. PATENT DOCUMENTS

| | | | |
|---|---|---|---|
| 2,042,147 | 5/1936 | Fairbrother | 313/596 |
| 3,430,102 | 2/1969 | Sidur | 315/200 R |
| 4,010,397 | 3/1977 | Hon | 315/57 |
| 4,065,370 | 12/1977 | Noble et al. | 313/594 |
| 4,153,861 | 5/1979 | Warner et al. | 313/594 |
| 4,234,906 | 11/1980 | Schindler | 362/17 |
| 4,304,479 | 12/1981 | Van Allen | 362/297 |
| 4,371,913 | 2/1983 | Broadt et al. | 362/17 |

FOREIGN PATENT DOCUMENTS 0459605 9/1949 Canada .................. 313/596

Primary Examiner—Saxfield Chatmon
Attorney, Agent, or Firm—Saidman, Sterne, Kessler & Goldstein

[57] ABSTRACT

An electronic light emitter comprising an electric-discharge tube having a transparent tube, a cathode, an anode, a trigger electrode, and a reflector for forwardly reflecting light emitted from the discharge tube. A reflecting portion is formed on the transparent tube to reflect light impinging thereupon toward the reflector, thereby limiting the direction in which the light emitted from the discharge tube passes outwardly from the transparent tube. The reflecting portion is formed of conductive material and is used as the trigger electrode.

19 Claims, 5 Drawing Figures

ELECTRONIC DISCHARGE TUBE AND ELECTRONIC LIGHT EMITTER USING IT

BACKGROUND OF THE INVENTION

1. Field of the Invention

This invention relates to an electronic light emitter, and more particularly to an electronic light emitter comprising an electric-discharge tube with means for reflecting light emitted from the discharge tube in a desired direction.

2. Description of the Prior Art

There has come into wide use an electronic light emitter or a stroboscopic tube comprising an electric-discharge tube, a reflector disposed on one side of the tube to reflect light emitted therefrom, and a housing for enclosing the electric-discharge tube and the reflector as well as circuitry for controlling the tube. In such a conventional electronic light emitter, the light emitted from the discharge tube radiates in almost every direction. Accordingly, in order to efficiently use the light emitted from the discharge tube, the reflector must be large enough to reflect a substantial part of the light in the desired direction. This significantly adds to the overall size of the light emitter which, especially when built in a photographic camera, is required to be as small as possible.

Further, a conventional electronic light emitter has a drawback in that the light emitting efficiency thereof is low since a high voltage is required for maintaining the discharge. Accordingly, the residual voltage in the main capacitor for energizing the discharge tube is high.

SUMMARY OF THE INVENTION

The primary object of the present invention is to provide an electric-discharge tube which can greatly reduce the overall size of an electronic light emitter employing it.

Another object of the present invention is to provide an electric-discharge tube with highly improved light emitting efficiency.

Still another object of the present invention is to provide an electronic light emitter which is small in size, especially in width.

Still another object of the present invention is to provide an electronic light emitter with highly improved light emitting efficiency.

The electric-discharge tube of the present invention is characterized by an elongated reflecting portion which is provided on the peripheral surface of an envelope of the electric-discharge tube and extends in the longitudinal direction thereof.

The reflecting portion reflects a part of the light emitted from the electric-discharge tube impinging thereon, and accordingly the light emitted from the tube cannot pass out of the tube through the area covered by the reflecting portion. The discharge tube may be used together with a reflector for directing the light emitted from the tube in a desired direction as in a stroboscopic tube for a photographic camera. In this case the reflector need not cover the area behind the reflecting portion. This reduces the size of the reflector, especially the width thereof, whereby the overall size of an electronic light emitter including the electric-discharge tube and the reflector can be greatly reduced.

In a preferred embodiment of the present invention, the reflecting portion is formed of a conductive material such as metal and is used as a trigger electrode. As described above, the reflecting portion is elongated and extends in the longitudinal direction of the tube, i.e., between the cathode and the anode thereof. Therefore, by using the reflecting portion as the trigger electrode, the voltage required for maintaining discharge of the discharge tube can be lowered, whereby the light emitting efficiency thereof can be improved.

The electric-discharge tube of the present invention may be provided with a plurality of said reflecting portions.

The electronic light emitter of the present invention includes an electric-discharge tube of the type as described above and a reflector having a reflecting surface which reflects in a desired direction the light impinging thereon including light directly impinging thereon and light impinging thereon after being reflected by the reflecting portion on the discharge tube.

The reflector may be in the form of a transparent body which encloses the discharge tube and is provided with the reflecting surface on a part of the outer surface thereof, or may be in the form of a protective housing carrying the reflecting surface on a part of the inner surface thereof.

DESCRIPTION OF THE PREFERRED EMBODIMENT

Figure 1:
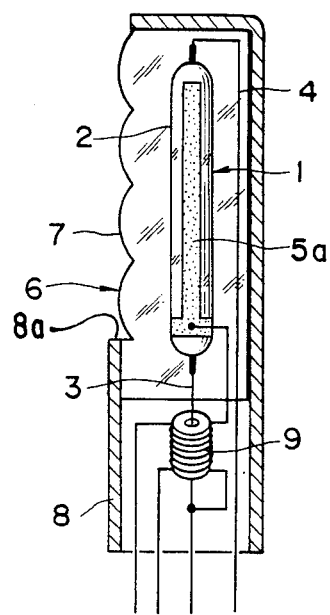
FIG. 1 is a cross-sectional view of an electronic light emitter in accordance with an embodiment of the present invention.

In FIG. 1, an electric-discharge tube 1 comprises an elongated transparent glass tube 2 in which xenon gas or the like, an anode (not shown) and a cathode (not shown) are enclosed in a conventional manner. A pair of wire leads 3 and 4 are connected to the cathode and the anode, respectively, and project outside the glass tube 2. On the peripheral surface of the glass tube 2 are provided three reflecting portions 5a to 5c (only one of which is shown in FIG. 1) which extend in the longitudinal direction of the tube 2. The reflecting portions 5a to 5c are formed of conductive material having high reflectivity such as silver or aluminum. These reflecting portions 5a to 5c serve to reflect light emitted from the discharge tube 1 and also function as a trigger electrode for the discharge tube 1 as will be described in detail hereinbelow.

The discharge tube 1 is enclosed in a transparent body 6 which is made of heat-resistant material, e.g., glass. The transparent body 6 may be a hollow body and the discharge tube may be simply inserted into the hollow transparent body 6. However, it is preferred that the transparent body 6 be molded around the discharge tube 1, whereby the connection between the wire leads and the discharge electrodes (cathode, anode, trigger electrode) may be prevented from being broken during assembly or transportation. On the front face of the transparent body 6 are formed a plurality of lenticular lenses 7 for effectively deflecting light as will be described hereinbelow. The transparent body 6 is encased in a protective housing 8 having an opening 8a so that the lenticular lenses are exposed through the opening 8a. A reflecting surface 13 (FIG. 3) is formed on the side faces and the rear face of the transparent body 6.

The wire lead 3 extends through a tubular ferrite core 9. Primary and secondary windings are wound around the ferrite core 9 opposed to each other with the positive end of the secondary winding connected to the trigger electrodes, i.e. the reflecting portions 5a to 5c, and the negative end thereof connected to the wire lead 3. When the primary winding is energized, a voltage is induced in the secondary winding and applied to the trigger electrodes. The trigger electrodes are relatively long and there are three such trigger electrodes in this particular embodiment. This significantly lowers the voltage required for maintaining a discharge in the electric-discharge tube 1. This results in lower residual voltage in the main capacitor for supplying an electric current to the discharge tube 1, whereby the light emitting efficiency is improved. In conventional electric-discharge tubes, the voltage required for maintaining the discharge is typically about 50 V, while in the discharge tube of this embodiment the voltage is about 30 V. In this embodiment, the primary and secondary windings are simply inserted into the protective housing 8 together with the transparent body 6. However, the transparent body 6 may be molded around the windings.

Figure 2:
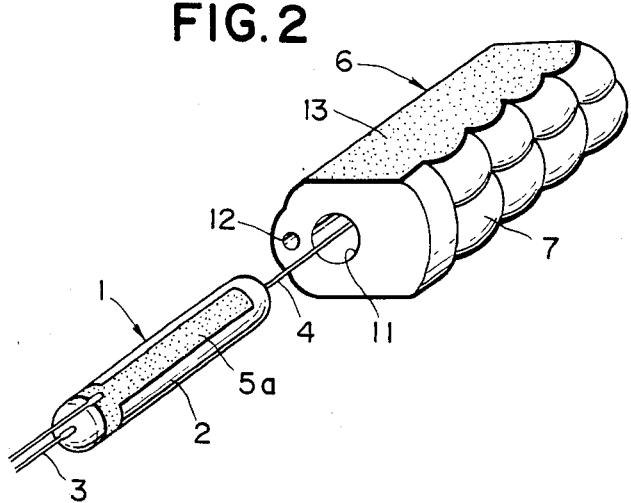
FIG. 2 is a perspective view showing a transparent body and an electric-discharge tube employed in the electronic light emitter of FIG. 1.

As shown in FIG. 2, the transparent body 6 is an elongated, solid block of transparent material provided with substantially tubular openings 11 and 12 at the bottom thereof. The electric-discharge tube 1 is inserted through the opening 11 and subsequently, the wire lead 4 is turned back to project through the opening 12. When the reflecting surface 13 is formed of conductive material, the wire lead 4 may be connected to the reflecting surface 13 to be connected to the power supply therethrough, whereby the opening 12 can be omitted. In this case, the reflecting surface 13 must be electrically insulated from the protective housing 8, otherwise the protective housing 8 should be made of an insulating material such as plastic.

Figure 3:
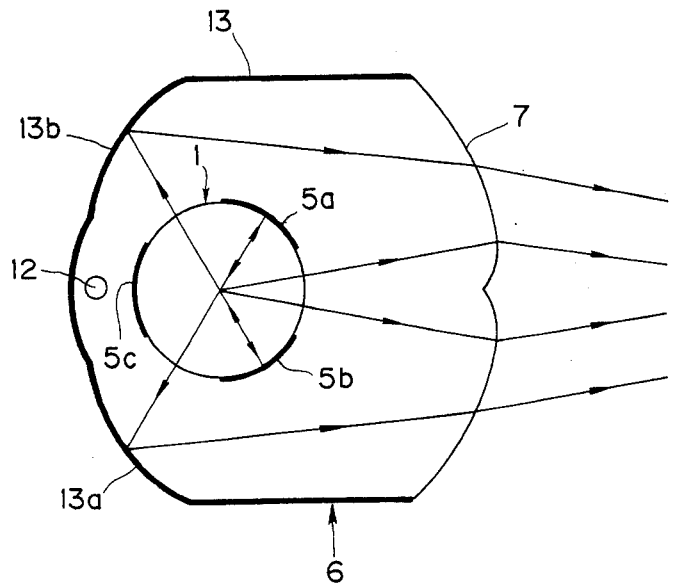
FIG. 3 is a schematic view illustrating optical paths of light emitted from the electronic light emitter of FIG. 1.

As shown in FIG. 3, the trigger electrodes (the reflecting portions 5a to 5c) are each of a width corresponding to an angle of 60° and are equally spaced from each other in the circumferential direction of the discharge tube 1. The part of the glass tube 2 of the discharge tube 1 facing the lenticular lenses 7 on the transparent body 6 is not provided with a reflecting portion.

Part of the light emitted from the discharge tube 1 travels directly through the part of the glass tube 2 between the reflecting portions 5a and 5b, and through the front portion of body 6 having the lenticular lenses 7 that permit light to leave body 6. Another part of the light emitted from the discharge tube 1 impinges upon the reflecting portion 5c and is reflected thereby to be emanated between the reflecting portions 5a and 5b and through the lenticular lenses 7. Another part of the light impinges upon the reflecting portion 5a to be reflected thereby toward the reflecting surface 13 on the rear portion of transparent body 6 and impinges thereupon at a portion denoted by 13a to be reflected toward the lenticular lenses 7. Still another part of the light emitted from the discharge tube 1 impinges upon the reflecting portion 5b to be reflected thereby toward the reflecting surface 13 at the rear portion of body 6 and impinges thereupon at a portion denoted by 13b to be reflected toward the lenticular lenses 7. Of course, part of the light emitted from the discharge tube 1 directly impinges upon the reflecting surface 13 at the portions 13a or 13b. As can be seen from FIG. 3, reflecting portions 5a and 5b effectively block a portion of the light emitted from tube 1 from reaching the side portion(s) of transparent body 6. Thus, without the reflecting portions 5a and 5b on the discharge tube 1, the reflecting surface 13 on the transparent body 6 would have to be much wider in order to forwardly reflect the light which would travel through the portion of the glass tube 2 covered by the reflecting portions 5a and 5b in this invention.

Figure 4:
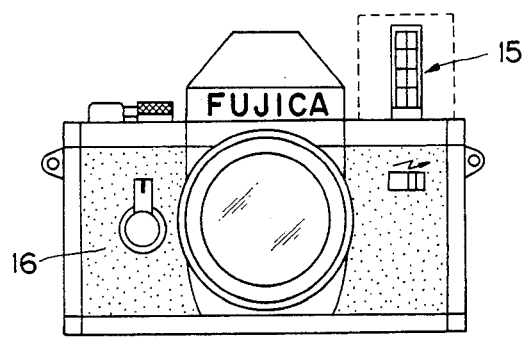
FIG. 4 is a front elevational view showing a photographic camera assembled with the electronic light emitter of FIG. 1.

Thus, in accordance with the present invention an elongated rod type electronic light emitter can be obtained. FIG. 4 shows an electronic light emitter 15 in accordance with the present invention assembled on a photographic camera 16, with the size of an electronic light emitter in accordance with the prior art shown by a broken line.

The reflecting portions 5a to 5c on the discharge tube 1 and the reflecting surface 13 on the transparent body 6 may be formed by vapor deposition or by bonding of a metal film. The reflecting surface 13 may be formed on the inner surface of the protective housing 8 instead of the outer surface of the transparent body 6.

In the above embodiment, there are three reflecting portions 5a to 5c. However, the number of reflecting portions provided on the discharge tube may be reduced to one as shown in FIG. 5.

Figure 5:
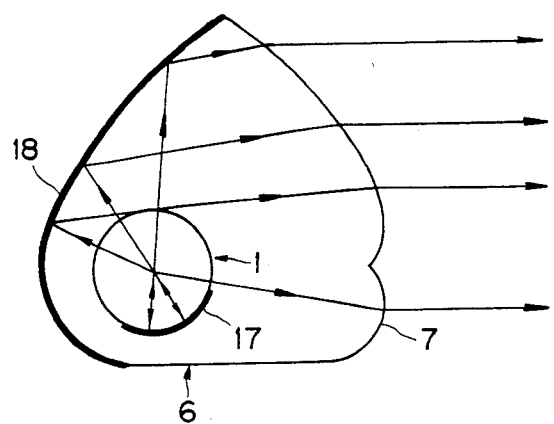
FIG. 5 is a schematic view similar to FIG. 3, but illustrating optical paths of light emitted from an electronic light emitter in accordance with another embodiment of the present invention.

In FIG. 5, a single reflecting portion 17 is provided on the discharge tube 1. The reflecting portion 17 is wider than the reflecting portions 5a to 5c in the above embodiment. In this embodiment, the lower end of the reflecting surface 18 is positioned adjacent to the lower edge of the discharge tube 1, while the upper end of the reflecting surface 18 extends beyond the upper edge of the discharge tube 1 to reflect light which travels through the upper part of the transparent tube 2. Thus, the overall width of the reflecting surface 18 in this embodiment is approximately equal to that of the reflecting surface 13 in the previous embodiment.

I claim:

1. An electronic light emitter comprising an electric-discharge tube having a cathode, an anode, a trigger electrode and a transparent tube with a peripheral surface for enclosing said cathode and anode, said trigger electrode being provided on said peripheral surface of said transparent tube and serving as a reflecting portion for reflecting light emitted from said electric-discharge tube toward outside said discharge tube; and a transparent body comprising an elongated, solid block of transparent material having a substantially tubular opening for receiving and enclosing said electric-discharge tube therein, said transparent body having a reflecting surface for reflecting the light reflected by said reflecting portion of said electric-discharge tube toward outside said transparent body.

2. An electronic light emitter as defined in claim 1, wherein said reflecting portion is formed of conductive material.

3. An electronic light emitter as defined in claim 1 or 2, further comprising a plurality of reflecting portions provided on said peripheral surface of said transparent tube.

4. An electronic light emitter as defined in claim 3, wherein a pair of said reflecting portions are formed on said peripheral surface of said transparent tube and are spaced from each other by an angle of 60° on the front side of said transparent tube, each of said pair of reflecting portions being of a width corresponding to an angle of 60°.

5. An electronic light emitter as defined in claim 4, further comprising a third reflecting portion formed on said peripheral surface of said transparent tube on the rear side thereof, said third reflecting portion being of the same width as each of said pair of reflecting portions and being equally spaced from each of said pair of reflecting portions.

6. An electronic light emitter as defined in claim 1, wherein said reflecting surface is formed on the outer surface of said transparent body.

7. An electronic light emitter as defined in claim 1, wherein said transparent body is molded around said electric-discharge tube.

8. An electronic light emitter as defined in claim 7, wherein said reflecting surface is formed on the outer surface of said transparent body.

9. An electronic light emitter as defined in claim 1, wherein said transparent body is encased within a protective housing and said reflecting surface is formed on the inner surface of said housing.

10. An electronic light emitter as defined in claim 1, further comprising windings for energizing said trigger electrode, said windings embedded in said transparent body together with said electric-discharge tube.

11. An electronic light emitter, which comprises:
- a transparent electric-discharge tube having a cathode and an anode enclosed in said tube and at least one trigger electrode;
- a transparent body comprising an elongated, solid block of transparent material having a substantially tubular opening for receiving and enclosing said tube and having reflecting surface means associated therewith for reflecting light impinging thereon toward outside said body; and
- reflecting means comprising said trigger electrode on the peripheral surface of said tube for reflecting a portion of light emitted from said tube towards said reflecting surface means of said body whereby the width of said light emitter is substantially reduced over what would be necessary without said reflecting means.

12. An electronic light emitter as defined in claim 11, wherein said reflecting means comprises at least two reflecting portions longitudinally extending along said tube.

13. An electronic light emitter as defined in claim 12, wherein said pair of reflecting portions are spaced from each other by an angle of about 60° on the front side of said tube.

14. An electronic light emitter as defined in claim 12, wherein said pair of reflecting portions are each of a width corresponding to an angle of about 60°.

15. An electronic light emitter as defined in claim 13, further comprising a third reflecting portion extending longitudinally along said tube at the rear side thereof, said reflecting portions being approximately equiangularly spaced about said peripheral surface and of approximate equal width.

16. An electronic light emitter as defined in claim 11, wherein the lower end of said reflecting surface means is positioned adjacent the lower edge of said tube, and the upper end of said reflecting surface means extends beyond the upper edge of said tube to reflect light emitted through the upper part of said tube.

17. An electronic light emitter as defined in claim 11, wherein said reflecting means includes said trigger electrode.

18. An electronic light emitter as defined in claim 11, wherein said reflecting means extends longitudinally along said peripheral surface of said tube.

19. An electronic light emitter as defined in claim 15, wherein said reflecting means includes said trigger electrode.

* * * * *